US005480173A

United States Patent [19]

Koniecko

[11] Patent Number: 5,480,173
[45] Date of Patent: Jan. 2, 1996

[54] WHEEL CHAIR HAVING LONGITUDINALLY ADJUSTABLE ARM RESTS

[76] Inventor: Jozef Koniecko, 3615 Techny Rd., Nirthbrook, Ill. 60062

[21] Appl. No.: 212,729

[22] Filed: Mar. 14, 1994

[51] Int. Cl.$^6$ ..................... B62M 1/14; A47C 7/54

[52] U.S. Cl. ..................... 280/250.1; 280/304.1; 280/647; 297/DIG. 4; 297/411.34

[58] Field of Search ..................... 280/250.1, 304.1, 280/647, 648; 297/DIG. 4, 411.3, 411.32, 411.34

[56] References Cited

U.S. PATENT DOCUMENTS

| | | | |
|---|---|---|---|
| 3,140,119 | 7/1964 | Offner | 297/DIG. 4 X |
| 3,584,890 | 6/1971 | Presty | 280/304.1 X |
| 3,632,162 | 1/1972 | Trethaway | 297/DIG. 4 X |
| 3,860,285 | 1/1975 | Hartman | 297/DIG. 4 X |
| 3,950,026 | 4/1976 | Van Seenus | 297/328 |
| 4,890,235 | 12/1989 | Reger et al. | 297/DIG. 4 X |
| 5,242,138 | 9/1993 | Kornberg | 297/411.36 |
| 5,255,934 | 10/1993 | Wilson | 297/DIG. 4 X |

*Primary Examiner*—Kenneth R. Rice
*Assistant Examiner*—F. Zeender
*Attorney, Agent, or Firm*—Samuel Kurlandsky

[57] ABSTRACT

A wheel chair having a frame, four wheels mounted on the frame, a seat supported on the frame, upper and lower horizontal guides mounted on the frame, movable arm rest supports slidably mounted on the guides, and an arm rest affixed to each of the arm rest supports, whereby the arm rests together with the arm rest supports may be extended to a normal use position, and whereby the arm rests and arm rest supports may be retracted to a rearward position to permit the wheel chair to be pushed close to a table for dining or other activities.

4 Claims, 2 Drawing Sheets

WHEEL CHAIR HAVING LONGITUDINALLY ADJUSTABLE ARM RESTS

BACKGROUND OF THE INVENTION

1. Field of the Invention

The present invention relates to wheel chairs, and more particularly refers to a wheel chair having arm rests which may be longitudinally moved to an extended position or to a retracted position.

2. Description of the Prior Art

Wheel chairs have been disclosed in the prior art which may be placed in the extended position to assist the occupant in bracing himself in order to help himself arise from the wheel chair, and which are hingedly mounted to be placed in a retracted position when the occupant wants to move close to a table in order to eat or engage in other activities at the table. However, such devices have generally been found to be unsatisfactory, since they are not sufficiently sturdy, and are difficult and expensive to fabricate.

SUMMARY OF THE INVENTION

It is an object of the invention to provide a wheel chair having a structure suitable for use as a wheel chair.

It is a further object to provide a wheel chair having arm rests which may be placed in an extended position to enable the occupant to remove himself from the wheel chair, and which may be placed in a retracted position when the occupant wishes to move the wheel chair close to a table in order to dine or engage in any activity utilizing the table.

It is still further an object of the invention to provide a structure of the type described which is sturdy and which provides adequate support to the occupant to enable him to lift himself out of the wheel chair with the arm rests in extended position.

The foregoing and other objects, advantages and characterizing features of the invention will become apparent from the following description of certain illustrative embodiments thereof considered together with the accompanying drawings, wherein like reference numerals signify like elements throughout the various figures.

According to the invention, a wheel chair is provided having a conventional frame which may be folded up for easy transportation, and having arm rests which are slidably mounted so that the occupant may move them to an extended position to assist him in rising out of the wheel chair, and which he may retract to a rearward position to enable him to move close to a table for dining.

DESCRIPTION OF THE PREFERRED EMBODIMENTS

Figure 1:
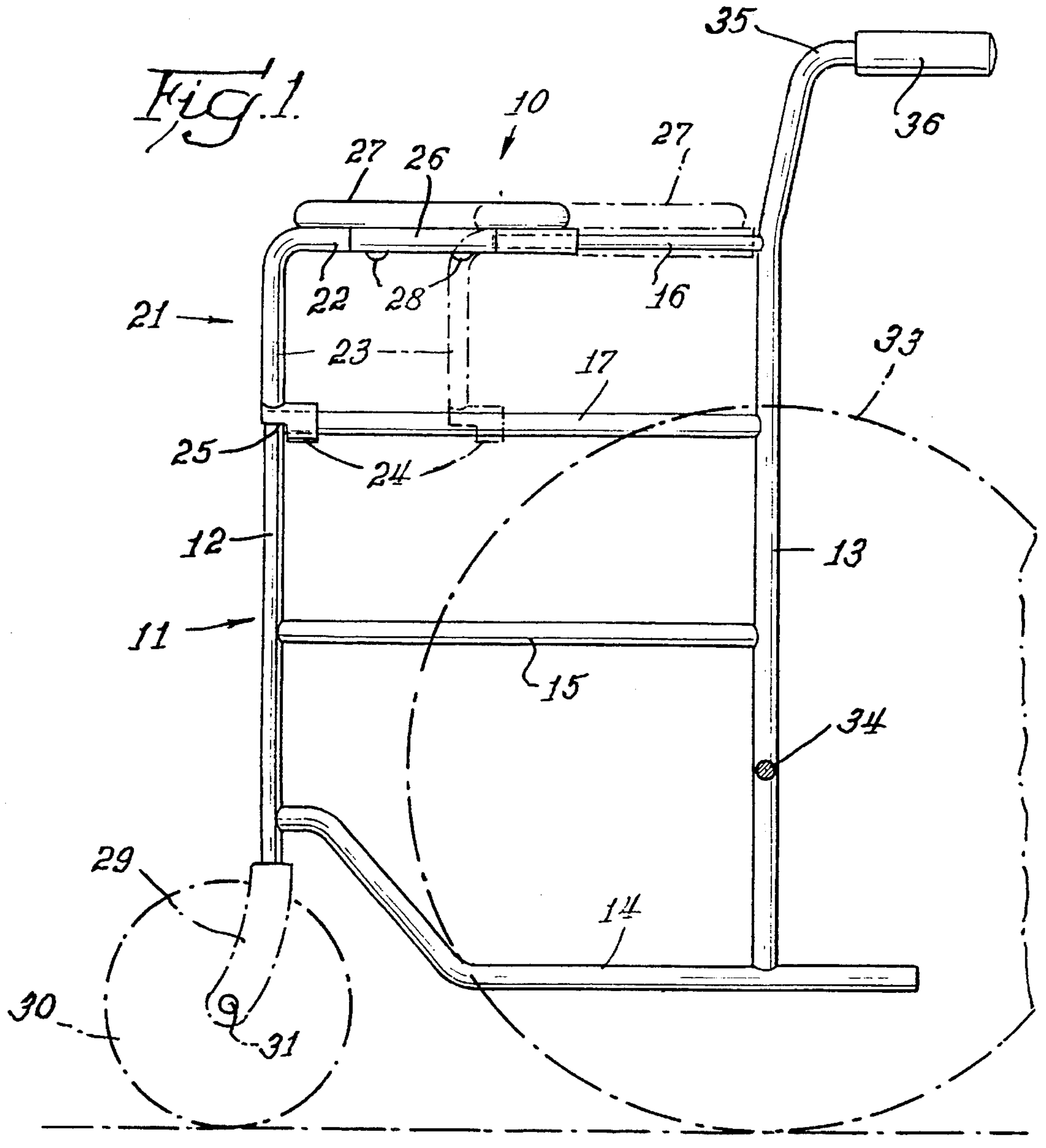
FIG. 1 is a side elevational view of the wheel chair of the invention, with the forward position of the arm rest shown in solid lines and the rearward position shown in broken lines.

Referring to FIG. 1, a wheel chair 10 according to the invention is shown, comprising a frame 11 having identical frame members on the right and left sides. The frame members comprise front vertical frame members 12, rear vertical frame members 13, lower horizontal frame members 14, and intermediate horizontal frame members 15.

Upper horizontal arm support guide members 16 are each mounted at one end connected to an upper portion of the rear vertical frame members 13, and extending forwardly for approximately one half of the distance to the front vertical frame members 12.

Figure 2:
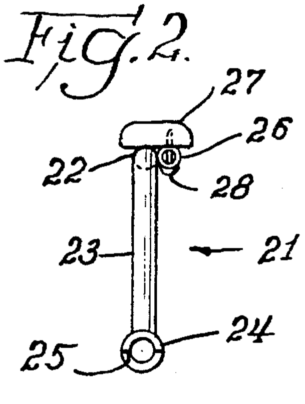
FIG. 2 a front elevational view of the arm rest and its support member.
Figure 3:
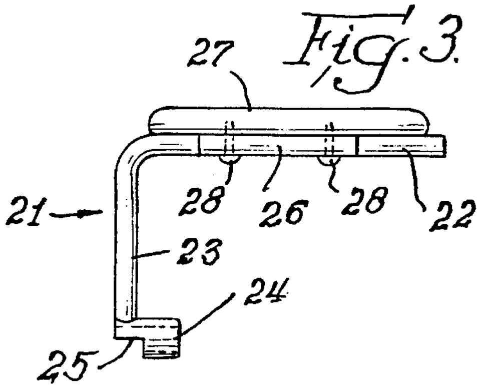
FIG. 3 is a side view of an arm rest and its support member.
Figure 4:
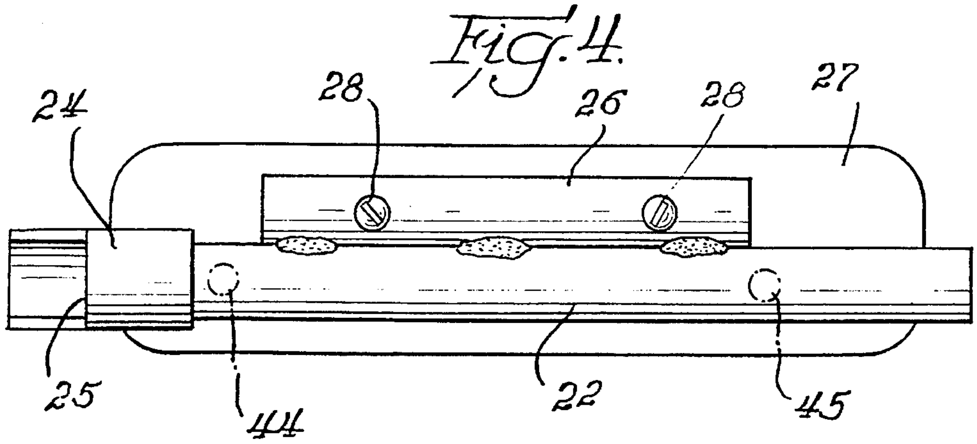
FIG. 4 is a bottom view of an arm rest and its support member.

A pair of L-shaped arm rest supporting guide members 21 formed preferably of tubular material such as steel are mounted on the frame. As shown in greater detail in FIGS. 2–4, the arm rest supporting guide members 21 each have a horizontal arm 22 and a vertical arm 23. The horizontal arm 22 is tubular in form and its channel is sufficiently large so that the upper horizontal arm rest supporting guide member 16 telescopes therein. Alternatively, although not shown, the support member 16 can be in the form of a tube large enough to have the horizontal leg 22 telescope therein. As shown particularly in FIGS. 2 and 4, a small collar 24 is affixed at the end of the vertical leg 23, as by welding. The collar 24 is slidably mounted over the lower horizontal arm rest supporting guide member 17. A notch or recess 25 is provided in the lower portion of the collar 24, so that when the arm rest support member 21 are extended to their foremost positions, the vertical arms 23 are in their respective positions coaxial with the front vertical frame members 12.

Plates or brackets 26 are affixed to each horizontal arm 22 by such means as welding, and are affixed to the arm rests 27 by screws or bolts 28 extending through apertures provided in the plates or brackets 26.

Rotatably mounted forks 29 are placed on the lower ends of the front vertical frame members 12 and support small wheels 30, diagrammatically shown, mounted on axles 31 retained in the forks 29. Larger wheels 33, diagrammatically shown, are mounted on axles 34 which are affixed to the rear vertical frame members 13. The ends of the rear vertical frame members 13 are bent to form handle bars 35 and provided with grips 36.

When the arm rest assembly is in the forward position, it assumes the position shown in solid lines. In this position the arm rests 27 are moved forward so that the occupant can brace himself on the arm rests and lift himself out of the chair. Also in that position the vertical arm 23 of the support member 21 is substantially coaxial with the front vertical frame members 12. Additionally, portions of the upper horizontal arm rest supporting guide members 16 are partially exposed. When the arm rest assembly is pushed rearwardly, the horizontal arms 22 telescope over the upper horizontal arm rest supporting guide members 16 and substantially cover them up. The arm rests retract to the position shown in the broken lines, and the collars 24 slide along the lower horizontal arm rest supporting guide members 17 and reach the position shown in broken lines. As a result, the wheel chair may be moved to a table with the portion containing the front vertical frame members entirely under the table until the vertical legs 23 of the support members 21 are reached.

Figure 5:
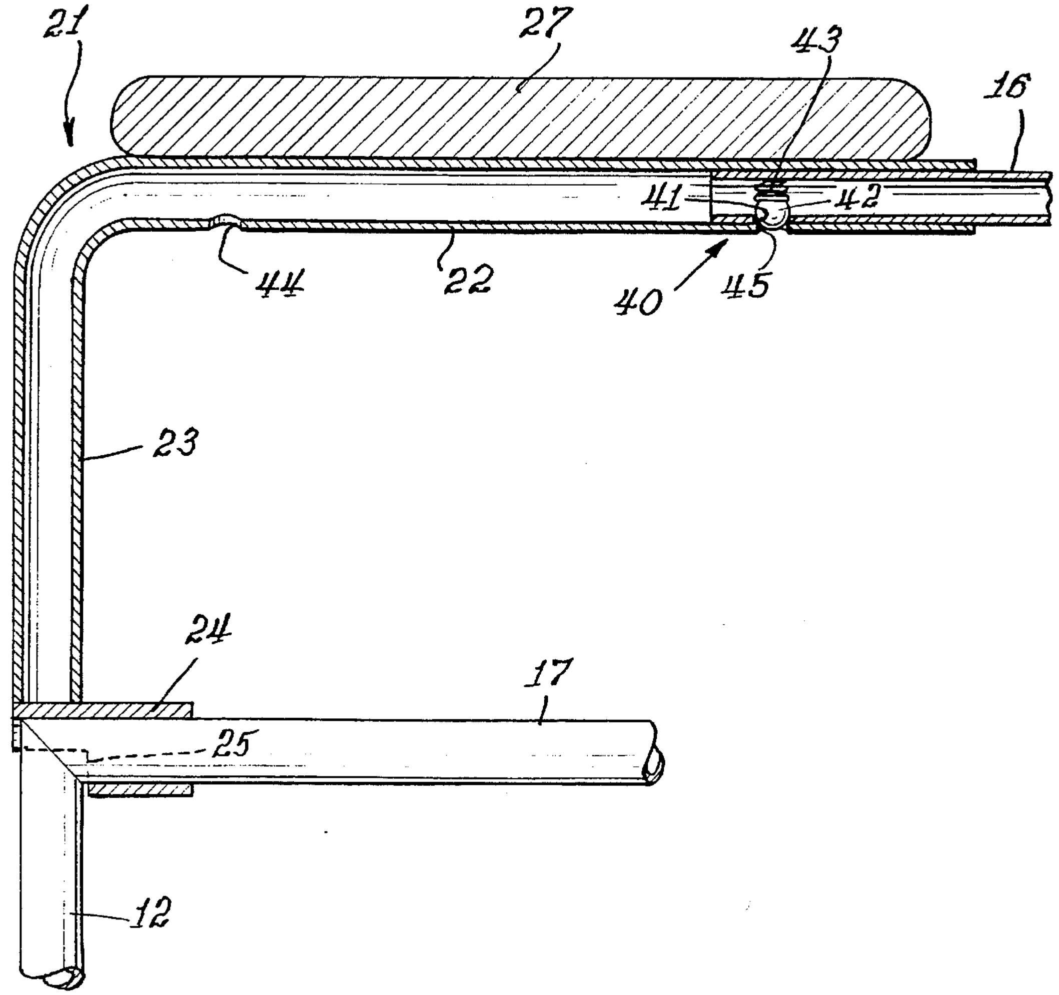
FIG. 5 is an enlarged fragmentary cross-sectional view of a portion of the L-shaped arm rest support members illustrating a detent arrangement.

Although the wheel chair of the present invention operates satisfactorily in the embodiment described and shown in FIGS. 1–4 of the drawings, if desired, as shown in FIG. 5, detent means may be placed in the upper horizontal arm supporting guide members 16 and cooperating means may be placed in the horizontal arms 22. As shown in FIG. 5, detent assemblies 40 are provided, including apertures 41 provided in the horizontal arms 16, and detent balls 42. The detent balls 42 are spring-loaded outwardly by means of a coil springs 43. The horizontal arms 22 are provided with detent-engaging apertures 44 and 45. The detent-engaging apertures 44 engage the detent balls 42 in the fully retracted position of the arm rest support member 21, and the detent-engaging aperture 45 engages the detent ball 42 in the fully extended position of the arm rest support members 21, thereby providing positive locking support and preventing accidental movement of the arm rest support members.

The wheel chair of the present invention has a number of advantages over those of the prior art. First, it enables the arm rests to be moved to a forward position to enable an occupant to lift himself out of the chair. Second, it enables the occupant to place the arm rest assembly in the retracted position to enable him or an attendant to slide a portion of the wheel chair under a table to facilitate dining. Third, the structure is very strong and rigid in either the forward or retracted position, differing in that respect from wheel chairs where the arm rests are hingedly retracted or removed entirely. Additionally, the wheel chair is relatively easy to fabricate and is relatively inexpensive to manufacture.

Although the invention has been described in connection with only specific embodiments thereof, it is evident that many alternatives, modifications, and variations will be apparent to those skilled in the art in the light of the foregoing description and drawings. Accordingly, it is intended to embrace all such alternatives, modifications and variations within the spirit and scope of the appended claims.

Invention is claimed as follows:

1. A wheel chair having a frame, comprising:

(a) front and rear vertical frame members, (b) horizontal frame members connected at their ends to said vertical frame members, (c) a seat mounted on said frame, (d) upper horizontal arm rest support guide members each connected at one end to a respective rear vertical frame member, and having each of their other ends extending forwardly, (e) lower horizontal arm rest support guide members, each connected at one end to one of said rear vertical frame members and each connected at the other end to one of said front vertical frame members, (f) movable L-shaped arm rest supporting members each comprising:

(1) a horizontal arm, and (2) a vertical arm extending from one end of said horizontal arm, said horizontal arms being in telescoping engagement with said upper horizontal arm rest support guide members, the lower ends of said vertical arms each having means slidably engaging one of said lower horizontal arm rest support guide members, arm rests being affixed to each one of the horizontal arms of said L-shaped arm rest supporting members, whereby, each of said arm rests and its L-shaped supporting member may be extended to a forward position for normal use, and whereby each of said arm rests and its L-shaped supporting member may be retracted to a rearward position to enable said wheel chair to be pushed close to a table for dining and other activities.

2. A wheel chair according to claim 1, wherein each of said horizontal arms is tubular having an axial channel, and wherein each of said upper horizontal arm rest support guide members is slidably disposed within the channel of one of said horizontal arms.

3. A wheel chair according to claim 2, wherein the lower ends of said vertical arms each has a tubular sector affixed thereto, each of said tubular sectors being slidably mounted over one of said lower horizontal arm rest support guide members.

4. A wheel chair according to claim 1, wherein detent means are provided in each of said upper horizontal arm rest support guide members, and complementary detent engaging means are provided in each of said horizontal arms.

* * * * *